Jan. 16, 1951  A. L. KANE ET AL  2,538,726
DOUBLE-ACTING PISTON ENGINE COMBINED WITH PUMP
Filed March 11, 1950  2 Sheets-Sheet 1

INVENTOR
ARTHUR L. KANE
ALTON L. KEMP
BY
ATTORNEY

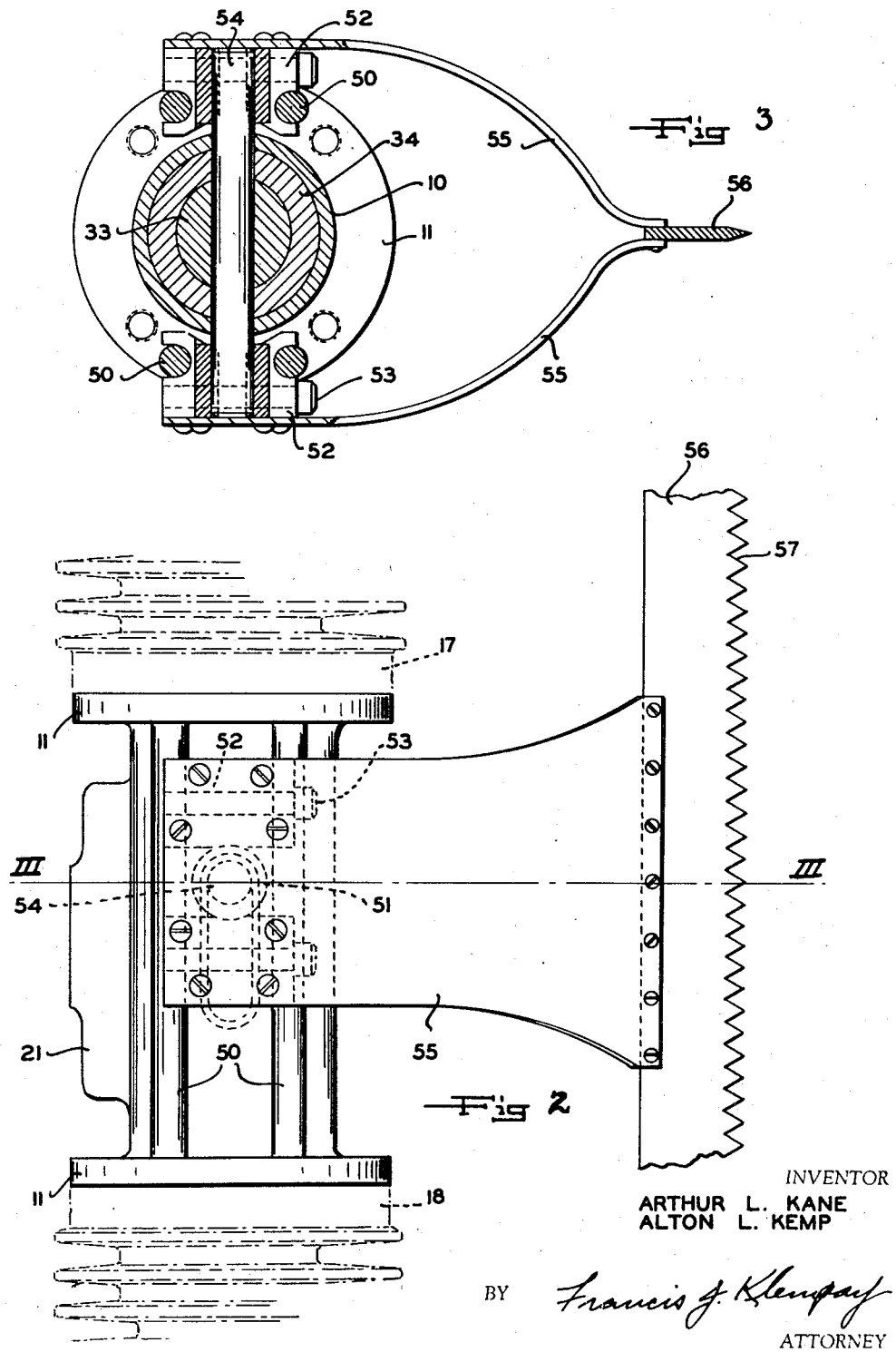

Patented Jan. 16, 1951

2,538,726

UNITED STATES PATENT OFFICE 2,538,726

DOUBLE-ACTING PISTON ENGINE COMBINED WITH PUMP

Arthur L. Kane and Alton L. Kemp, Youngstown, Ohio, assignors of one-fourth to said Arthur L. Kane, one-fourth to said Kemp, one-fourth to Myron R. Kane, and one-fourth to Steve Yourstowsky, all of Youngstown, Ohio Application March 11, 1950, Serial No. 149,169

8 Claims. (Cl. 123—62)

This invention relates to internal combustion engines of the direct reciprocating type not requiring a fly wheel and more particularly to an improved and simplified arrangement for feeding gaseous fuel into the combustion cylinder or cylinders of such engines. While it is common practice in two cycle internal combustion engines to pre-compress the gaseous fuel mixtures before introduction into the combustion cylinders, the mechanical arrangements heretofore proposed for this purpose are not suitable for application to extremely simple direct reciprocating engines of the opposed cylinder type. Accordingly, the primary object of our invention is to provide a simple yet improved and practical arrangement for pre-compressing the gaseous fuel charges in a direct acting reciprocating engine of the two cycle internal combustion type employing opposed combustion cylinders for driving the power-producing piston assemblies in opposite directions whereby the dependability of such engines is increased while the same yet retain their elemental simplicity.

Another object of the invention is the provision in an engine of the character outlined above of an improved arrangement for taking off the developed power therefrom and of an improved arrangement for mounting a tool to be driven directly on the engine.

The above and other objects and advantages of the invention will become apparent upon consideration of the following detailed specification and the accompanying drawing wherein there is disclosed a preferred embodiment of the invention.

In the drawing:

Figure 2 is a fragmentary plan view of the engine of Figure 1 showing one of its possible uses; and Figure 3 is a transverse sectional view taken along the line III—III of Figure 2.

Figure 1:
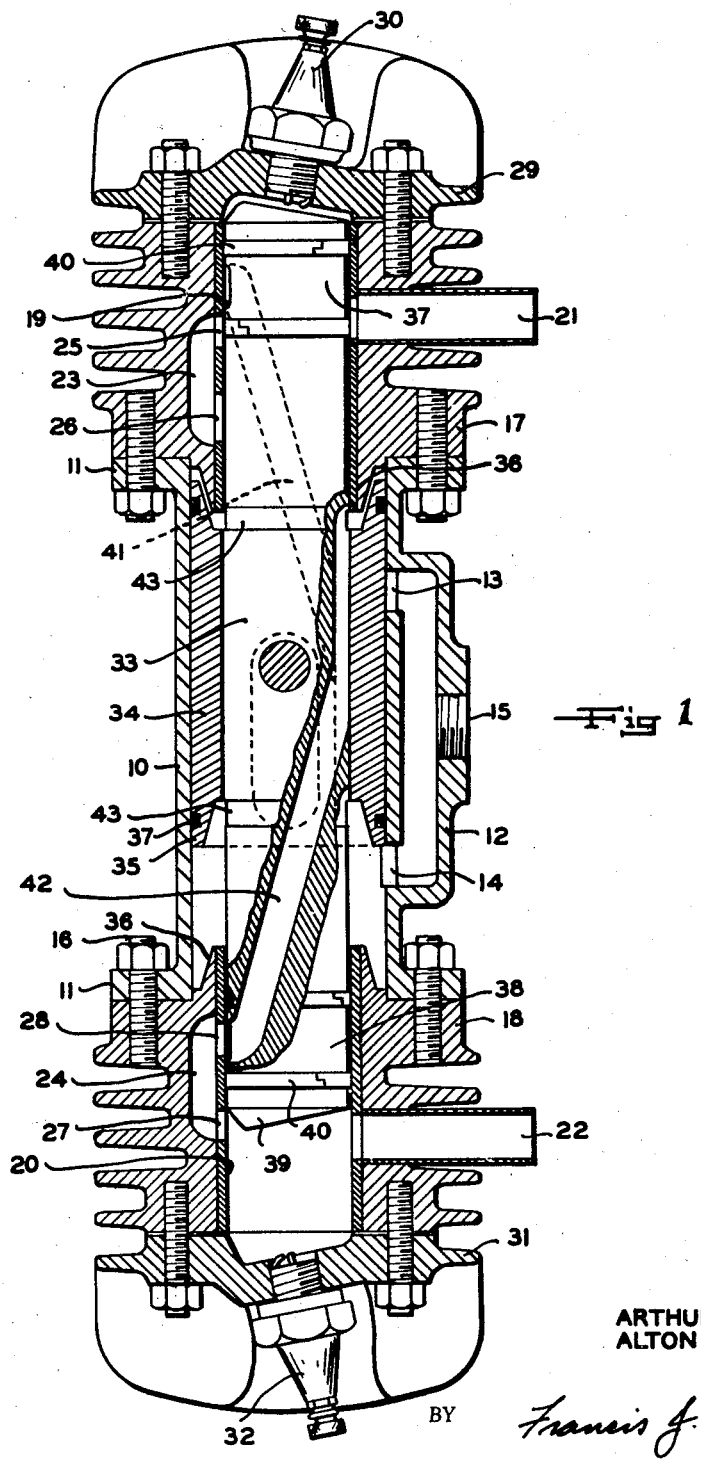
Figure 1 is a longitudinal section, with parts broken away, of a reciprocating internal combustion engine constructed in accordance with our invention.

Referring to the drawing in detail and particularly Figure 1, we provide a first cylinder 10 which is of tubular construction as shown and which is formed at each end with a heavy integral outwardly directed flange 11. An inlet manifold 12 is formed on one side of the cylinder 10 and communicating with this manifold is a pair of axially spaced inlet ports 13 and 14 which are symmetrically disposed about the center transverse plane of the cylinder. Manifold 12 is itself provided with an inlet port 15 adapted to be connected to a carburetor, not shown, whereby gaseous fuel may be supplied to the manifold 12.

Rigidly secured to the flanges 11 by means of the stud bolts 16, for example, is a pair of finned aluminum castings 17 and 18 which constitute the bodies of the side walls of the combustion cylinders, each of which is provided with a steel lining sleeve—the sleeve for cylinder 17 being identified by reference numeral 19 and the sleeve for cylinder 18 being identified by reference numeral 20. An exhaust port 21 formed in the sleeve and body of the cylinder 17 is provided while a similar exhaust port 22 is provided for the cylinder 18.

Diametrically opposite the ports 21 and 22 but positioned closer to the center of the engine are the axially elongated recesses 23 and 24, respectively, which are formed in the side walls of the bores through the cylinders 17 and 18. The sleeve 19 is apertured at 25 in register with the outer end of the recess 23 to provide an inlet port for the cylinders 17 and is further apertured at 26 in register with the inner end of the recess 23 to provide a feed port, the function of which will be explained below. Sleeve 20 is similarly apertured at 27 in register with the outer end of recess 24 to provide an inlet port for the cylinder 18 and at 28 in register with the inner end of recess 24 to provide a feed port.

Cylinder 17 is provided with a detachable cast finned head 29 mounting a spark plug 30 while a similar head 31 mounting a spark plug 32 is provided for the cylinder 18.

Slidably received in the cylinders thus provided (which cylinders are axially aligned), is a unitary piston assembly 33 having as its center portion an elongated double-ended piston 34 which is slidably received in the first cylinder 10 and which is of such length that upon the assembly 33 being moved to the end of its stroke in one direction one of the ports 13 or 14 will be fully uncovered and upon movement of the assembly to its opposite limiting position the other of the ports 13 or 14 will be fully uncovered. It should be observed that the internal diameter of the sleeves 19 and 20 is considerably smaller than the bore of the cylinder 10 so that there is provided an annular compression space in each end of the cylinder 10 outwardly of the ports 13 and 14. Further, it should be noted that the axial length of the piston 34 is such that these annular compression spaces are substantially closed up alternately upon reciprocation of the piston assembly and for a purpose to be later described the opposite ends of the piston 34 are formed with tapering axially disposed flanges 35 which are adapted to nest with the axially extending tapering flanges 36 formed on the inner ends of the cylinders 17 and 18. If desired, a sealing ring 37 may be provided in each end of the cylinder 34.

The opposite end portions of the piston assembly 33 provide pistons 37 and 38 which are slidably received in the cylinders 17 and 18, respectively, and it should be noted that the head end of each of these pistons 37 and 38 is formed with a scavenging surface 39, the function and operation of which is well understood in the art and need not be repeated here. Each of the pistons 37 and 38 is preferably provided with a spaced pair of sealing rings 40 disposed substantially as shown.

The piston assembly 33 is machined to provide a pair of crossed passages 41 and 42 and it will be observed that the passage 41 extends from the side wall of the piston 37 intermediate the rings 40 to the far end wall of the piston 34, as viewed in Figure 1, while the passage 42 extends from the side wall of the piston 38 to the opposite end wall of piston 34. The passages 41 and 42 are circumferentially spaced from each other in the center portion of the piston assembly so that there can be no communication between them. The function of the passages 41 and 42 is to transfer the gas from the angular compression chambers at the ends of cylinder 10 into the respective feed ports 26 and 28 and to facilitate the entry of the gas from the compression chambers into the passages, the piston assembly is circumferentially grooved at the opposite ends of the piston 34 as shown at 43. The outflow is further aided by the tapering nature of the flanges 35 and 36.

In addition to the carburetor, not shown, or other gaseous fuel supplying device attached to the manifold inlet 15, the engine is supplied with a suitable ignition system, also not shown, for energizing the plugs 30 and 32 in properly timed sequence and of course the breaker points for such system as well as the distributor associated therewith, may be operated from the power connection extending outwardly from the piston assembly 33 to be described below.

While the engine of our invention may be used for many applications requiring a reciprocating power source, we have, for the sake of illustration, shown in Figures 2 and 3 a representative use of the engine in the nature of an oscillating toothed blade for cutting grass and weeds. Referring now more particularly to Figures 2 and 3 it will be noted that we provide on opposite sides of the cylinder 10 a circumferentially spaced pair of parallel rods 50 which are anchored at their ends in the flanges 11 of the cylinder 10. Slidably mounted on each pair of rods 50 is a crosshead comprised of a block 51 which is clamped between a plurality of slide blocks 52 by means of the cap screws 53 and in Figure 3 it will be observed that the blocks 52 are formed with semicylindrical recesses whereby the entire crosshead assembly will be accurately guided on the rods 50. Having its ends rigidly secured in the blocks 51 and extending diametrically through the engine assembly is a power takeoff pin 54 which is tightly received in a transversely extending bore formed in the parts 33 and 34 of the piston assembly, and which is slidably received in axially elongated apertures formed in the side wall of the cylinder 10. Rigidly secured to each crosshead assembly is a curved plate 55 and the cutter blade 56 having a toothed edge 57 is clamped between the outer adjacent ends of the plates 55. In practice, the assembled engine and cutter bar assembly will be provided with a suitable wheeled support, not shown, whereby the cutter blade 56 may be moved horizontally over the surface of the ground in performing its function.

The engine described above operates in the following manner—assuming the existence of a suitable lubricating gaseous fuel supply and a suitable ignition system: In the position of the parts shown in Figure 1 the gas in the combustion space in cylinder 17 is properly comprised for combustion, the annular compression space in the lower end of cylinder 10 is filled with raw gaseous fuel and the gaseous fuel pressure in passage 42 and recess 24 is expelling the spent gases in the cylinder 18 out of the exhaust 22 while filling this cylinder with fresh fuel, this process being aided by the scavenging head 39 on piston 38. If now the plug 30 is energized the burning and expansion gas in the cylinder 17 forces the piston assembly downwardly and in doing so the charge in cylinder 18 is compressed while the inlet manifold port 14 is closed to trap the next incoming gas charge in the lower end of cylinder 10 which is thereafter compressed in this annular space and in the passage 41 by continued downward movement of the piston 34. Toward completion of the downward stroke of the piston assembly 33 the upper termination of passage 41 registers with the feed inlet 26 of the cylinder 17 to replace the spent gas in the upper cylinder 17 with fresh gas. In this manner effective two cycle operation is obtained in a simple reciprocating engine of the opposed cylinder type. The pre-compression of the charging fuel is most effective in insuring that an adequate charge of combustible gas will be furnished each combustion cylinder at each stroke and since it is absolutely necessary in simple reciprocating engines of the general kind here involved that a power impulse be obtained in each opposed cylinder at each stroke. The importance and advantage of such insurance becomes obvious.

It should now be apparent that we have provided an improved reciprocating engine of the opposed cylinder internal combustion type which accomplishes the objects initially set out. While the engine is of extreme simplicity it is, nevertheless, dependable in operation due principally to the arrangement provided for pre-compressing the gas charges and for utilizing the resultant increased inlet pressure to scavange the combustion cylinders of spent gases.

The above specifically described embodiment of the invention should be considered as illustrative only as obviously many changes may be made therein without departing from the spirit or scope of the invention. Reference should therefore be had to the appended claims in determining the scope of the invention.

We claim:

1. In an internal combustion engine having a pair of spaced and axially aligned cylinders closed at their outer ends and each having an exhaust port; each of said cylinders having an inlet port diametrically opposite the exhaust port and a feed port axially aligned with said inlet port and spaced inwardly therefrom, and means providing communication between said feed port and said inlet port; a third cylinder interposed between said first mentioned cylinders and axially aligned therewith and being of larger diameter than either of said first mentioned cylinders, said third cylinder having a pair of spaced inlet ports positioned equidistantly inward from either end thereof, and a multiple piston assembly slidably received in said cylinders and having at either end thereof a scavenging piston for cooperating with said exhaust ports and the inlet ports of said first mentioned cylinders, a double-ended piston centrally disposed on said assembly for sliding movement in said third cylinder and being of a length to uncover one or the other of the inlet ports to said third cylinder upon reaching either end of its stroke, and means in said assembly forming a crossed pair of passages interconnecting the compressed end of said third cylinder with the feed inlet of the exhausted one of said first cylinders upon said assembly reaching an end of one of its strokes.

2. An engine according to claim 1 further including a longitudinally disposed slot in the side wall of said third cylinder, and a power takeoff pin rigidly secured to said piston assembly and projecting outwardly through said slot, said slot and pin being spaced circumferentially from the closed passages in said piston assembly.

3. An engine according to claim 1 further characterized in that a portion of the inner end walls of said first mentioned cylinders constitute the end walls for said third cylinder.

4. An engine according to claim 1 further characterized in that each of said first mentioned cylinders is provided with a sleeve-like insert forming the side wall of the cylinder, said inserts having spaced apertures forming the exhaust ports, inlet ports and feed ports, respectively, and a portion of the inserts forming a part of the passage means interconnecting the feed ports and the inlet ports in each cylinder.

5. A reciprocating internal combustion engine comprising a first cylinder having a pair of spaced inlet ports in its side wall, a pair of combustion cylinders rigidly attached to the opposite ends of said first cylinder and having smaller internal diameter than the internal diameter of the first cylinder, each of said combustion cylinders having an exhaust port and diametrically opposed therefrom a pair of axially spaced ports, a U-shaped passage in the side wall of each of said combustion cylinders interconnecting the said spaced ports therein, an elongated piston assembly having a centrally disposed and elongated double-ended piston slidably received in said first cylinder and mounting at each end thereof a scavenging-type of piston slidably received in the combustion cylinders, and means in said piston assembly providing passages to interconnect the innermost of one of said spaced ports of one of the combustion cylinders with the far end of said first cylinder when said piston assembly is at one end of its path of travel and to connect the innermost of said pair of ports of the other of said combustion cylinders with the other end of said first cylinder upon said piston assembly reaching the opposite end of its path of travel.

6. Apparatus according to claim 5 further including an axially disposed slot in the side wall of said first cylinder intermediate the ends of said elongated piston when in any of its positions, and a power takeoff pin rigidly secured to said piston assembly and extending outwardly through said slot.

7. Apparatus according to claim 5 further characterized in that both ends of said first cylinder are provided with an outwardly disposed flange, said combustion cylinders being finned and being rigidly secured to said flanges.

8. Apparatus according to claim 7 further including an axially disposed slot in the side wall of said first cylinder positioned between the ends of said elongated piston when in any of its positions, a pair of spaced parallel rods spanning said flanges outwardly of said first cylinder, a crosshead slidably mounted on said rods for reciprocating movement along a path parallel with the axis of said cylinders, and a pin rigidly interconnecting said piston assembly and said crosshead and extending through said slot.

ARTHUR L. KANE.
ALTON L. KEMP.

REFERENCES CITED

The following references are of record in the file of this patent:

UNITED STATES PATENTS

| Number | Name | Date |
| --- | --- | --- |
| 595,489 | Meredith | Dec. 14, 1897 |
| 923,562 | Munsch | June 1, 1909 |
| 1,230,086 | Carhart | June 12, 1917 |
| 1,316,437 | Flood | Sept. 16, 1919 |
| 1,377,356 | Lavallee | May 10, 1921 |

FOREIGN PATENTS

| Number | Country | Date |
| --- | --- | --- |
| 138,133 | Great Britain | 1920 |